United States Patent [19]

Hashimoto

[11] Patent Number: 4,459,432

[45] Date of Patent: Jul. 10, 1984

[54] TELEPHONE CHARGE INTEGRATING AND DISPLAYING DEVICE AND SYSTEM

[75] Inventor: Kazuo Hashimoto, Tokyo, Japan

[73] Assignee: Hashimoto Corporation Kabushiki Kaisha, Tokyo, Japan

[21] Appl. No.: 343,935

[22] Filed: Jan. 29, 1982

[30] Foreign Application Priority Data

Feb. 5, 1981 [JP] Japan .................................. 56-16236

[51] Int. Cl.³ .................. H04M 15/08; H04M 15/30; H04M 15/38
[52] U.S. Cl. .............................. 179/7.1 R; 179/81 R
[58] Field of Search .............. 179/7.1 R, 7 R, 7.1 TP, 179/90 D, 90 B, 90 BD, 81 R, 18 DA, 2 TC, 5.5, 110; 364/467, 705; 368/4

[56] References Cited

U.S. PATENT DOCUMENTS

| | | | |
|---|---|---|---|
| 4,041,291 | 8/1977 | Pauda ........................... | 179/7.1 R X |
| 4,264,956 | 4/1981 | Delaney ....................... | 179/7.1 R X |
| 4,356,352 | 10/1982 | Hilliges .......................... | 179/7.1 R |

FOREIGN PATENT DOCUMENTS 2427749  2/1980  France ............................. 179/7.1 R Primary Examiner—Stafford D. Schreyer
Attorney, Agent, or Firm—Oblon, Fisher, Spivak, McClelland & Maier

[57] ABSTRACT

A telephone charge integrating and displaying device adapted for carrying out a new simplified charge system for telephone calls wherein all telephone charges are classified into, for example, only four block areas, (1) a local telephone call area, (2) a long distace telephone call area, (3) an international telephone call area reached by ordinary means, and (4) a telephone call area reached by space satellite or the like. The device is installed at each subscriber's telephone and the integrating operation, which is started when the handset is hooked off and is stopped when it is hooked on, is switched to a predetermined integration rate simply by dialing predetermined codes specified in accordance with each bloc area mentioned above.

5 Claims, 1 Drawing Figure

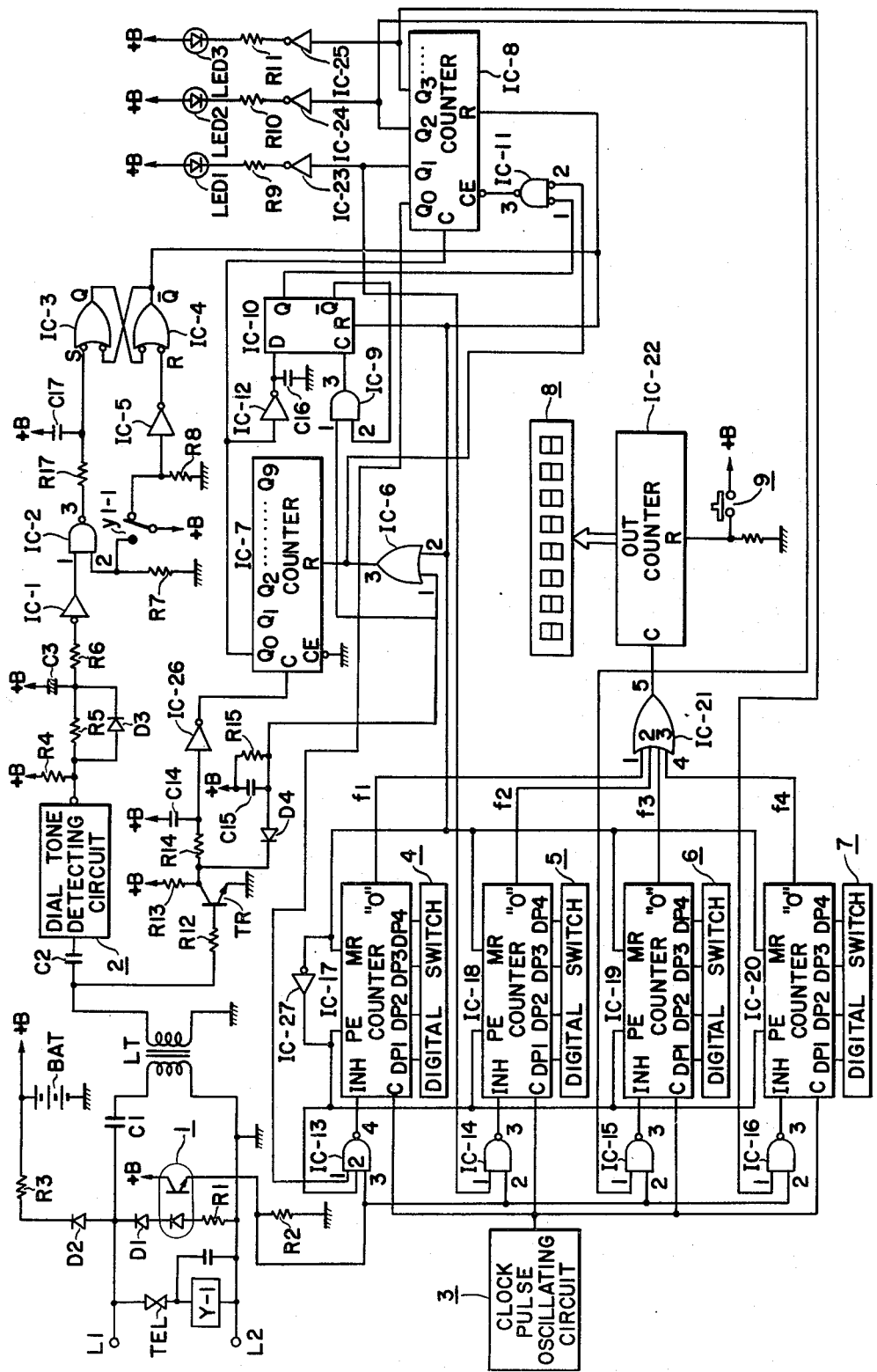

TELEPHONE CHARGE INTEGRATING AND DISPLAYING DEVICE AND SYSTEM

BACKGROUND OF THE INVENTION

This invention relates to a telephone charge integrating and displaying device and system.

Recently, owing to remarkable development in telephone exchange techniques and peripheral techniques thereof, inclusive of various communication cables such as optical cables, there has been brought about a decrease in both the manufacturing and maintenance costs of telephone exchange systems.

Accordingly, it has become possible to set telephone charges uniformly in each telephone bloc area irrespective of the distance between a calling party and a called party. Assuming that all telephone charges are classified into, for example, only four block areas, namely, (1) a local telephone call area, (2) a long distance telephone call area, (3) an international telephone call area reached by ordinary means, and (4) a telephone call area reached by space satallite or the like, it is possible to apply a uniform charge for a telephone call in each respective bloc area. In the case where such a charge system is adopted, it can clearly replace very complicated conventional charge systems for a telephone call where various fees have been fixed in accordance with specific rules in each country or each city all over the world.

In order to carry out a new charge system for a telephone call proposed by the present invention, it will be surely attained by installing a telephone charge meter which is of the integrating type according to the present invention at each subscriber's premises. Also, where the system of the present invention is combined with a system in which the telephone number of a calling party is displayed on the side of a telephone set which receives the calling signal while the calling bell is ringing, a called party always can prevent a mistake telephone conversation by the unwilling calling party.

SUMMARY OF THE INVENTION

A first object of this invention is to provide a telephone charge meter which is installed at a subscriber's premise like a watt meter, and which automatically integrates and displays a telephone charge according to the lapse of time after the handset has been picked up (or hooked off) and, when the handset is hooked on, stops the integration to continuously display the integration result.

A second object of the invention is to provide a telephone charge meter which, when a telephone set with the meter receives a calling signal, detects the calling signal so that it is not operated.

A third object of the invention is to fundamentally change the present telephone charge system, and more specifically to provide a telephone charge meter which integrates and displays a telephone charge at a low speed in the case of a local telephone call in which the digit "0" is not dialed immediately after the handset is picked up, at a middle speed uniformly all over the country in the case of a toll telephone call in which the digit "0" is dialed first, at a high speed in the case of an international telephone call in which the digit "0" is dialed twice first, and at a higher speed in the case of a telephone call through satellite communication or the like in which the digit "0" is dialed three times first, thus carrying out the speed control in several steps.

The term "uniformly all over the country" mentioned above is provided with the assumption that the provision of optical fibers reduces the operating cost of telephone exchange systems to the extent that toll telephone charges can be set uniformly all over the country, in future.

The digit "0" is dialed twice for an instantaneous telephone call all over the world. In this case also, the technical concept of the invention bases on the assumption that telephone calls are charged at the same rate all over the world.

The digit "0" dialed three timees for communication through a satellite or other communication. In the communication, the integration is carried out at high speed.

Thus, when the user picks up the handset, the meter integrates and displays a telephone charge, which can be read externally by any one.

Hereinbefore, the digit "0" is dialed to select a specified area; however, the same function can be attained by dialing any code corresponding to the digit "0".

In order to install the device which practices the invention, it is desirable that the device does not include mechanically driven components and can be used semi-permanently and that it is operated by a small current which can be drawn from the telephone line.

The principle, nature and utility of the invention will become more apparent from the following detailed description when read in conjunction with the accompanying drawing.

BRIEF DESCRIPTION OF THE DRAWING

The single FIGURE in the accompanying drawing is a circuit diagram, partly as a block diagram, showing one preferred embodiment of this invention.

DETAILED DESCRIPTION OF THE INVENTION

This invention will be described with reference to the single FIGURE in the accompanying drawing.

In the single FIGURE, reference character TEL designates a telephone set; L1 and L2, telephone lines; 1, a photo-coupler for detecting line polarity inversion; 2, a dial tone detecting circuit comprising a PLL for instance; 3, a clock pulse generating circuit for generating clock pulses which are used fundamentally for charge display; 4, 5, 6, and 7, digital switches for setting the rates of local, toll, international and satellite calls, respectively; 8, a liquid crystal display unit; and Y-1, a relay which is operated when the telephone set is hooked off, the relay having a contact means y1-1.

Integrated circuits essentially employed in the circuit shown in the single FIGURE will be described. In the FIGURE, reference characters IC-7 and IC-8 designate decimal counters such as MC14017 which are commercially available; IC-17 through IC-20, down counters for frequency division such as MC14526 which can be preset, the frequency division ratios of them being set by the digital switches 4 through 7; IC-22, a counter circuit having a drive circuit for the 8-digit liquid crystal display unit 8. Further in the single FIGURE, reference character BAT designates a chargeable battery which can be used semi-permanently.

In a standby state that the above-described circuit, or device, is not operated, the telephone set TEL is in "on hook" state, and the relay Y-1 connected in series to the telephone set is not energized yet. Therefore, the armature of the contact means y1-1 is tripped to its right contact as shown in the FIGURE, and an R-S flip-flop consisting of IC-3 and IC-4 is reset through an inverter IC-5 (the reset terminal R being at a low logic level (hereinafter referred to merely as "L", when applicable). Therefore, the terminal $\overline{Q}$ of the flip-flop is at a high logic level (hereinafter referred to merely as "H", when applicable). This output of the flip-flop is applied through an OR gate IC-6 to the decimal counter IC-7 to reset the latter IC-7, applied directly to the reset terminal R of the decimal counter IC-8 to reset the latter IC-8, and applied directly to the reset terminals MR of the down counters IC-17 through IC-20 to reset the latter IC-17 through IC-20. Similarly, a D flip-flop IC-10 is reset. Therefore, outputs Q0 of the decimal counters IC-7 and IC-8 are at "H", and outputs "0" of the down counters IC-17 through IC-20 are at "L". These outputs "0" are applied to an OR gate IC-21. Thus, the input level to the clock terminal C of the counter IC-22 is maintained unchanged, and the count value of the counter IC-22 is not increased. In addition, when the device is used for the first time, it is required to reset the counter IC-22 by operating a manual reset switch 9 thereby to reset the numerals which have been integrated by now to zero.

A voltage across the lines L1 and L2 is used to charge through a diode D2 and a resistor R3 the battery BAT at all times. Since the device is mainly composed of C-MOSs and liquid crystal devices, current consumed thereby is of the order of 100 $\mu$A. Therefore, even when current flowing in the lines is used to charge the battery, the lines will never be adversely affected.

Now, the operation of the device in the case when the telephone set with the device dials a local telephone number, will be described. When the telephone ste TEL is hooked off, the relay Y-1 is energized so that the armature of the contact means y1-1 is tripped over to the left contact. As a result, the reset state of the flip-flop (IC-3 and IC-4) is released. At the same time, the telephone office detects the hooking off of the telephone set TEL, to send a dial tone to the telephone set TEL. The dial tone is detected by the dial tone detecting circuit 2. When the circuit 2 detects the dial tone for about 0.5 second with the aid of a time constant circuit consisting of a resistor R5 and a capacitor C3, the flip-flop (IC-3 and IC-4) is reset through an inverter IC-1 and a NAND gate IC-2. Therefore, the terminal $\overline{Q}$ is set at "L", and as is apparent from the above description the reset states of the counters IC-7, IC-8 and IC-17 through IC-20 are released. However, for a period of time other than a period of time in which dialing is being performed (as described later), the counter IC-7 is maintained reset through a resistor R15 and the OR gate IC-6, because a transistor TR is non-conductive (off).

Since the local telephone number should be dialed, first a number other than the number "0" should be dialed. When the number "1" is dialed for instance, a dial pulse is applied through a line transformer LT and a resistor R12 to the transistor TR to render the letter TR conductive (on), so that a capacitor C15 is charged quickly, and accordingly the reset state of the counter IC-7 is released through the OR gate IC-6.

After the reset state of the counter IC-7 has been released, the aforementioned single dial pulse, after being delayed by a delay circuit having a resistor R14 and a capacitor C14, is applied through an inverter IC-26 to the clock terminal C of the counter IC-7. Thereupon, the counted value of the counter IC-7 becomes "1", and the terminal Q1 of the counter IC-7 is raised to "H" (the terminal Q0 being set to "L"). When the terminal Q0 is set to "L" this way, the terminal D of the D flip-flop IC-10 is raised to "H". When the aforementioned single dial pulse vanishes, the capacitor C15 which has been charged by the dial pulse is discharged through the resistor R15. Soon the terminals 1 and 3 of the OR gate IC-6 are raised to "H", and at the same time the clock terminal C of the flip-flop IC-10 is raised through terminals 1 and 3 of an AND gate IC-9. When the counter IC-7 is reset, the level of the terminal D of the flip-flop IC-10 is restored to "L" from "H". However, the restoration of the level of the terminal D to "L" is delayed by a capacitor C16, and during this period of delay the terminal C is raised to "H", and therefore the flip-flop IC-10 is set, as a result of which the terminals Q and $\overline{Q}$ of the flip-fop IC-10 are set to "H" and "L", respectively. When the terminal Q is raised to "H", the terminal 1 of an AND gate IC-11 is raised to "H", whereby the clock enable terminal CE of the counter IC-8 is held at "H". When the clock enable terminal CE is raised to "H" as described above, the counter IC-8 inhibits an input through the clock terminal C; that is, even when a signal is applied to the clock terminal C, the counter IC-8 does not count the signal.

Thus, when a number other than the number "0" is firstly dialed or when a number other than a series of "0's" is firstly dialed, the D flip-fop IC-10 is reset, so that the counting operation of the decimal counter IC-8 is suspended. Thus, even if "0" is included in a local telephone number, a telephone charge is correctly integrated. The above-described time constant circuit (C15 and R15) is used for detecting a minimum pause.

Upon dialing of the local telephone number, a ring back tone calling the called party is sent back to the telephone set. The ring back tone includes a signal component of 400 Hz, which is detected by the dial tone detecting circuit 2. The output of the dial tone detecting circuit 2 operates to set the flip-flop (IC-3 and IC-4) which has been set already, thus causing no erroneous operation.

When the called party picks up the handset, the polarities of the terminals L1 and L2 are inverted. As a result, the photo-coupler 1 is operated through a diode D1, a voltage at "H" is developed across a resistor R2, and the terminal 3 of a NAND gate IC-13 and the terminals 2 of NAND gates IC-14, IC-15 and IC-16 are raised to "H". However, in the case of a local telephone number, among the output terminals Q0 through Q3, only the output terminal Q0 is at "H", and therefore, among the NAND gates IC-13 through IC-16, only the NAND gate IC-13 is enabled. That is, as the terminal 2 of the NAND gate IC-13 is raised to "H" by an inverter IC-27 when the reset states of the counters have been released as described before, the terminals 1, 2 and 3 of the NAND gate IC-13 are raised to "H", while the terminal 4 is set to "L". This output "L" is applied through the terminal INH of the counter IC-17 to the terminal C, to release the inhibition of a clock input from the clock pulse oscillating circuit 3. The counter IC-17 frequency-divides the oscillation frequency of the clock pulse oscillating circuit 3 with the ratio which is set by the digital switch 4 to produce a signal f1. The signal f1 is applied through the OR gate IC-21 to the counter IC-22, where it is counted. The counted value is displayed on the liquid crystal display unit 8. By suitably selecting the clock pulse oscillation frequency and the frequency division ratio, the counted value can be made to directly indicate the telephone charge.

When the called party hangs up the handset before the calling party does, the polarities of the terminals L1 and L2 are restored, and therefore the photo-coupler 1 is disabled, while the counter IC-17 is disabled through the NAND gate IC-13. Therefore, the counted value of the counter IC-22 is maintained unchanged, and accordingly the display is maintained unchanged.

When the telephone set TEL with the device is hooked off in succession, the relay Y-1 is deenergized, so that the armature of the contact means y1-1 is tripped to the right contact as shown, to reset the flip-flop (IC-3 and IC-4). In this operation, the counters IC-17, etc. are reset as described before, the device is placed in the standby state again.

On the other hand, when the calling party (having the device) hangs up the handset before the called party does, the counter IC-22 and the display are stopped when the counter IC-17 is reset through the above-described contact means y1-1.

Now, the operation of the device in the case where the toll telephone number starting with the digit "0" is dialed, will be described. However, the description of the operation which is similar to that in the case where a local telephone number is dialed, will be omitted here.

When "0" is dialed after the telephone set TEL is hooked off, dial pulses are applied through the line transformer LT to the base of the transistor TR, so that the transistor TR is turned on and off as many times as the number of dial pulses. The on-off operations of the transistor TR are transmitted through the inverter IC-26 to the decimal counter IC-7, where they are counted, as described before. At the same time, similarly as in the above-described case, the capacitor C15 is charged by the dial pulses, to release the reset state of the counter IC-7.

With one dial pulse, the terminal Q1 of the counter IC-7 is raised to "H"; and with two dial pulse, the terminal Q2 is raised to "H". Similarly, with nine dial pulses, the terminal Q9 is raised to "H"; and with ten dial pulses, the terminal Q0 is raised to "H". When, under this condition, a minimum pause occurs, the capacitor C15 is discharged. When the signal having the level "H" is applied to the clock terminal C of the flip-flop IC-10 through the terminals 1 and 3 of the AND gate IC-9, the data terminal D of the flip-flop IC-10 is set to "L" through the terminal Q0 (at "H") of the counter IC-7 and the inverter IC-12, and therefore the flip-flop IC-10 is not reset. Thus, the terminal Q of the flip-fop IC-10 is maintained at "L". Therefore, the clock enable terminal CE of the counter IC-8 is set to "L" through the terminals 1 and 3 of the AND gate IC-11, so that a signal applied to the clock terminal C of the counter IC-8 can be inputted.

Thus, when the terminal Q0 of the counter IC-7 is raised to "H", the counted value of the IC-8 becomes "1". Therefore, the terminal Q1 of the counter IC-8 is raised to "H", and a light emitting diode LED1, which indicates the fact that a toll telephone number is dialed, is turned on through an inverter IC-23. At the same time, the input 1 of the NAND gate IC-14 is raised to "H" by the output Q1 of the counter IC-8. The input 2 of the NAND gate IC-14 is raised to "H" for the first time when the called party picks up the handset as described before. Thus, in this case, the counter IC-18 for toll call is inoperative. When a number other than "0" is next dialed, the D flip-flop is set, to inhibit a count input to the counter IC-8. Therefore, even if any digit of the telephone number after the second digit is "0", the counted value of the counter IC-8 is not increased, and accordingly the output 01 of the counter IC-8 is maintained at "H". When the called party hooks off the telephone after the telephone number has been dialed, the polarities of the lines L1 and L2 are inverted, whereupon the photo-coupler 1 is operated. By the output of the photo-coupler 1, the input 2 of the NAND gate IC-14 is raised to "H", and the counter IC-18 for frequency division is operated, so that a frequency division output f2 set by the digital switch 5 is provided at the output "0". The output f2 is counted by the counter IC-22 as described before, and the counted value is integrated with the previous value and the resultant value is displayed on the liquid crystal display unit 8. The restoration operation in the case of the toll call is the same as that in the case of the local call described above.

In the case of an international telephone call, two digits "0 0" are dialed succession. Thereupon, the output Q0 of the counter IC-7 is raised to "H" twice. Therefore, the output Q2 of the IC-8 is raised to "H", as a result of which a light emitting diode LED2 is turned on. When the called party hooks off the telephone, the counter IC-19 is operated to output a frequency division signal f3, which is counted and displayed as described above.

In the case of a telephone call through satellite communication, the counter IC-20 is operated to output a frequency division signal f4, which is displayed. The frequency of the above-described signals f1, f2, f3 and f4 are so selected to meet the following expression:

$$f1 < f2 < f3 < f4$$

The operation of the device in the case when a third party calls the telephone with the device, will be described.

The calling signal includes an audible signal of 400 Hz. The audible signal is detected by the dial tone detecting circuit 2, and the output of the circuit 2 charges the capacitor C3. However, before the telephone set TEL is hooked off, the relay Y-1 is in the "off" state and its contact means is as shown in the FIGURE. Therefore, the flip-flop (IC-3 and IC-4) is in the reset state and its terminal $\bar{Q}$ is maintained at "H", and accordingly the counters IC-7 and IC-8 are in the reset state. Thus, no change occurs on the liquid crystal unit 8.

When the telephone set TEL is hooked off, the relay Y-1 is energized to trip the armature of its contact means y1-1 to the left contact, thereby to raise the input 2 of the NAND gate IC-2 to "H". At the same time, the calling signal is stopped, and the capacitor C3 is therefore quickly discharged through the diode D3. Therefore, the input 1 of the NAND gate IC-2 is set to "L", and accordingly the flip-flop (IC-3 and IC-4) is not set. Thus, as is apparent from the above description, no change occurs on the liquid crystal display unit 8. A time constant circuit consisting of a resistor R17 and a capacitor C17 is so designed that the above-described flip-flop is not set even when the input 1 of the gate IC-2 is raised to "H" during the period that the capacitor C3 is discharged.

As is clear from the above description, in the invention, unlike the conventional telephone charge system, call meters are not provided at the telephone exchange office; that is, a charging meter is installed at each subscriber's, a value (time x charging rate) is integrated and displayed when the telephone is hooked off, the integration and display speed is automatically changed in several steps, the integration is not carried out, when the telephone set is hooked off, in response to a calling signal, and furthermore the integration is not effected in the case where, when the telephone set is hooked off, no dial tone is sent, for instance, because a trouble occurs in the telephone exchange office. Thus, the invention has significantly improve the conventional telephone charge system, and provided an effective countermeasure against the mischief that the switchboard is controlled by the terminal.

While one preferred embodiment of the invention has been illustrated and described in detail, it is particularly understood that the invention is not limited thereto or thereby. Especially, in order to distinguish a local telephone call, a toll telephone call, an international telephone call and a telephone call through satellite communication or the like from each other, the number of the digit "0" dialing after the handset has been picked up may be optionally determined in response to the circumstance. Also, although the hooking off of the handset in the embodiment is merely used as means for making a closed circuit, it is of course that other various means can be used for the latter.

What is claimed is:

1. A telephone charge integrating and displaying device adapted to be located on a subscriber's premises, comprising:
   meter means, which is started when a handset of a telephone set is hooked off or the like, for integrating and displaying an accumulation of plural telephone call charges, wherein each telephone call charge is determined according to a period of time for which a party-to-party connection is made and according to one of a plurality of cost rates predetermined according to a type of call;
   means for carrying out the integration at a low speed in the case where the digit "0" or any code corresponding thereto is not dialed after said handset has been hooked off;
   means for carrying out the integration at a middle speed which is faster than said low speed when the digit "0" or any code corresponding thereto is dialed once;
   means for carrying out the integration at a high speed which is faster than said middle speed when the digit "0" or any code corresponding thereto is dialed twice; and
   means for carrying out the integration at a higher speed which is faster than said high speed when the digit "0" or any code corresponding thereto is dialed thrice, said telephone charge being predetermined to increase as the number of times of said dialing of the digit "0" or any code corresponding thereto increases.

2. A device as claimed in claim 1, which comprises:
   means for inhibiting, when no dial tone is detected after said handset has been hooked off, the readying of the integration means until a dial tone is detected.

3. A device as claimed in claim 1, which comprises:
   means for causing, even if the digit "0" is dialed in dialing a local or toll telephone number after the integration has been started, the integration to be continued according to a predetermined speed.

4. A system of integrating and displaying a telephone charge, said system adapted to be located on a subscriber's premises, comprising:
   meter means which is started when a handset of a telephone set is hooked off or the like, for integrating and displaying an accumulation of plural telephone call charges, wherein each telephone call charge is determined according to a period of time for which a party-to-party connection is made and according to one of plurality of cost rates predetermined according to a type of call;
   means for carrying out the integration at a low speed in the case where the digit "0" or any code corresponding thereto is not dialed after said handset has been hooked off;
   means for carrying out the integration at a middle speed which is faster than said low speed when the digit "0" or any code corresponding thereto is dialed once;
   means for carrying out the integration at a high speed which is faster than said middle speed when the digit "0" or any code corresponding thereto is dialed twice;
   means for carrying out the integration at a higher speed which is faster than said high speed when the digit "0" or any code corresponding thereto is dialed thrice; and
   means for inhibiting, when a user picks up said handset in response to a calling signal, activation of the integration means.

5. A telephone charge integration and displaying device adapted to be located on a subscriber's premises, comprising:
   meter means initiated by a predetermined operation of a handset of a telephone set for integrating and displaying an accumulation of plural telephone call charges, wherein each telephone call charge is determined according to a period of time for which a party-to-party connection is made and according to one of plurality of cost rates predetermined according to a type of call;
   means for carrying out the integration at a first speed when none of plural predetermined codes is dialed after said predetermined operation of said handset;
   means for carrying out the integration at a second speed which is faster than said first speed when a first predetermined code is dialed after said predetermined operation of said handset;
   means for carrying out the integration at a third speed which is faster than said second speed when a second predetermined code is dialed after said predetermined operation of said handset; and
   means for carrying out the integration at a fourth speed which is faster than said third speed when a third predetermined code is dialed after said predetermined operation of said handset.

* * * * *